United States Patent [19]

Kubo

[11] Patent Number: 5,439,333
[45] Date of Patent: Aug. 8, 1995

[54] COOLANT FEEDER IN A TOOL HOLDER ASSEMBLY

[75] Inventor: Haruaki Kubo, Nara, Japan

[73] Assignee: Daishowa Seiki Co., Ltd., Osaka, Japan

[21] Appl. No.: 198,159

[22] Filed: Feb. 17, 1994

[30] Foreign Application Priority Data

Jun. 18, 1993 [JP] Japan .................................. 5-147851
Jul. 27, 1993 [JP] Japan .................................. 5-184627

[51] Int. Cl.6 ................................................ B23Q 11/10
[52] U.S. Cl. ................................. 409/136; 408/57
[58] Field of Search .................. 408/56, 57, 59, 60; 409/136

[56] References Cited

U.S. PATENT DOCUMENTS

| | | | |
|---|---|---|---|
| 4,557,643 | 12/1985 | Cioci | 408/59 |
| 4,652,189 | 3/1987 | Mizoguchi | 408/239 R |
| 4,865,495 | 9/1989 | Hinds | 408/57 |

FOREIGN PATENT DOCUMENTS

| | | | |
|---|---|---|---|
| 72657 | 2/1983 | European Pat. Off. | 408/57 |
| 2103123 | 2/1983 | United Kingdom | 408/59 |

*Primary Examiner*—Daniel W. Howell
*Attorney, Agent, or Firm*—Schweitzer Cornman & Gross

[57] ABSTRACT

A coolant feeder in a tool holder assembly which has a rotary shaft for mounting from the spindle of an associated machine tool, the feeder comprising a stationary support member for journaling the rotary shaft, a stationary coolant feeder ring assembly having a hollow interior is disposed adjacent to the stationary support member, the stationary coolant feeder ring assembly being in fluid communication with a radially extending tool holding passage within the rotary shaft, a coolant coupling device having a hollow interior, a coolant pipe for maintaining fluid communication between the hollow interior of the coolant coupling device, the stationary support member, the passage, and the coolant feeder ring assembly.

18 Claims, 8 Drawing Sheets

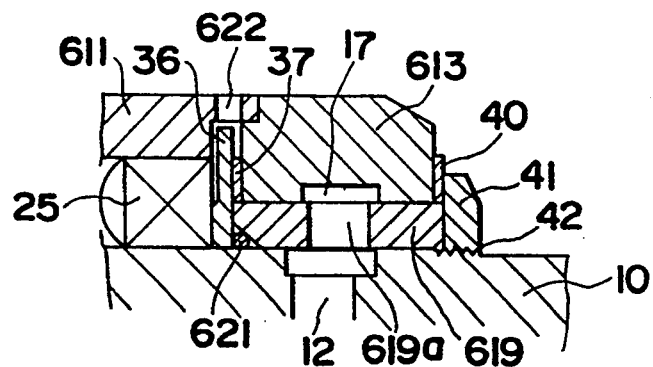
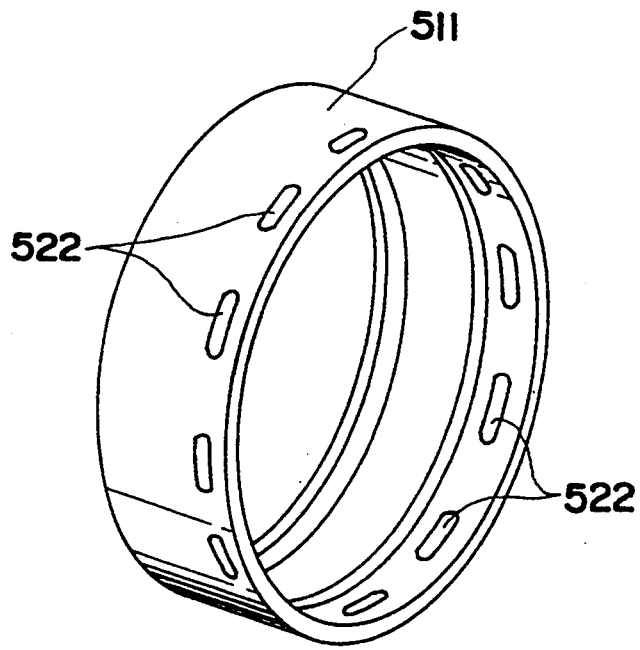

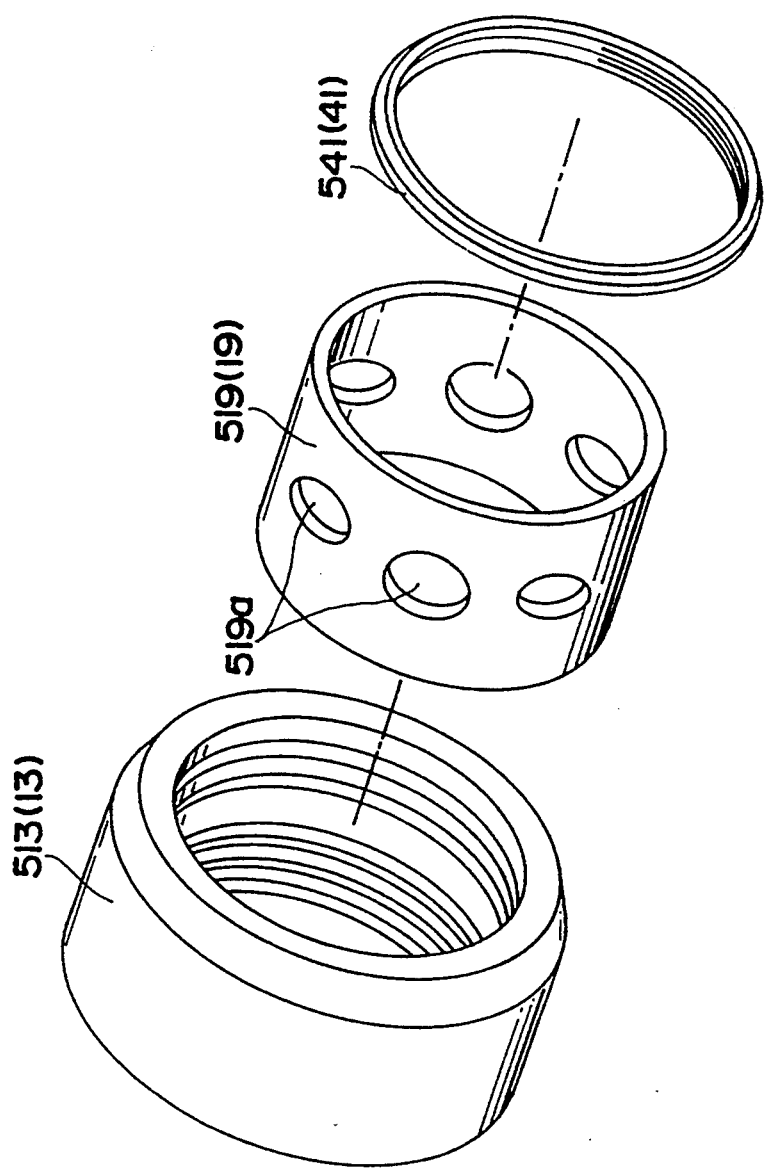

COOLANT FEEDER IN A TOOL HOLDER ASSEMBLY

FIELD OF THE INVENTION

The present invention relates to a tool holder assembly for mounting cutting tools to the spindle, and more particularly, to a tool holder with a coolant feeder which feeds with an oiling wheel coolant from the oil feed passage in the machine tool side to rotating cutting tools.

BACKGROUND OF THE INVENTION

As shown in FIG. 14, conventional oil feeders in tool holders of this type, have a stationary support member 3 which journals the rotary shaft 1 (for mounting from the spindle of a machine tool) for rotation in the member and removable coolant feeding passage connector to be discussed later, which can be attached to and removed from the coolant feeder on the machine tool. This permits coolant to flow through coolant feeding passage, to tools mounted in the rotary shaft. This feeds coolant to the oiling wheel of the tools through the coolant passage.

Since a coolant feeding passage is formed within the interface 8 between the stationary support member 3 at rest and the rotary shaft 1 in rotation, oil tight sealing rings 5 are disposed between the support member and the rotating shaft to prevent coolant leakage from the interface.

Over an extended period of service, cuttings and shavings can enter the mechanism and contaminate the coolant and thus become entrained between the oil tight sealing ring 5 and the circumferential rotating surface of the shaft 1 and dent or scratch the surface of the rotary shaft 5 as shown in a broken line H in FIG. 14. This breaks the oil tightness of the sealing rings and causes coolant leakage which can enter the bearings 2 along each side of the coolant feeding passage and can cause frequent accidents and damage to the bearings 2.

In the past, we attempted to prevent this problem by installing, as shown in FIG. 15, a replaceable sleeve 4 between the bearings 2 and between the rotary shaft 1 and the stationary support member 3, and to provide support for the oil tight rings 5.

Thus in the configuration shown in FIG. 15 when cuttings and shavings enter from the outside or contaminate the coolant enter between the oil tight sealing rings 5 and the surface of the sleeve 4 rotatably in contact with the sealing rings, the sleeve 4 had merely to be replaced without any need to replace the entire costly rotary shaft 1, thus reducing repairing costs by a considerable amount.

However, in our aforementioned improvement of the prior art, repair maintenance required to replace the sleeve 4 disassembly of the stationary support member 3 that is supported by bearings 2 and built integrally with the coolant passage connector, and reassembly to the original state when the sleeve 4 was replaced.

SUMMARY OF THE INVENTION

It is the primary object of the present invention to provide a coolant feeder in the tool holder which permits simple servicing by replacing only a worn portion without interfering with the fluid feeding operation in service, that is, without disassembling the stationary support member or coolant passage connector.

It is another object of the present invention to provide a coolant feeder in the tool holder which will not interfere with the service, because it does not require disassembling the stationary support member or coolant passage connector even if the rotary shaft is slightly worn.

DESCRIPTION OF THE DRAWING

Further features and advantages are described in the following detailed disclosure, with reference being had to the drawings, wherein:

FIG. 1a is a partial cross-sectional view of a second embodiment of the coolant feeder ring assembly of the embodiment shown in FIG. 1;

FIG. 11 is a partial cross-sectional view of the essential part of a seventh embodiment of the present invention;

FIG. 12 is a partial perspective view of the essential part of the embodiments of FIGS. 8 and 9;

FIG. 13 is a partial exploded perspective view of the embodiments of FIGS. 10 and 11;

It will be recognized that some or all the Figures are schematic representations for purposes of illustration and do not necessarily depict the actual relative sizes or locations of the elements shown.

DETAILED DESCRIPTION OF THE INVENTION

Figure 1:
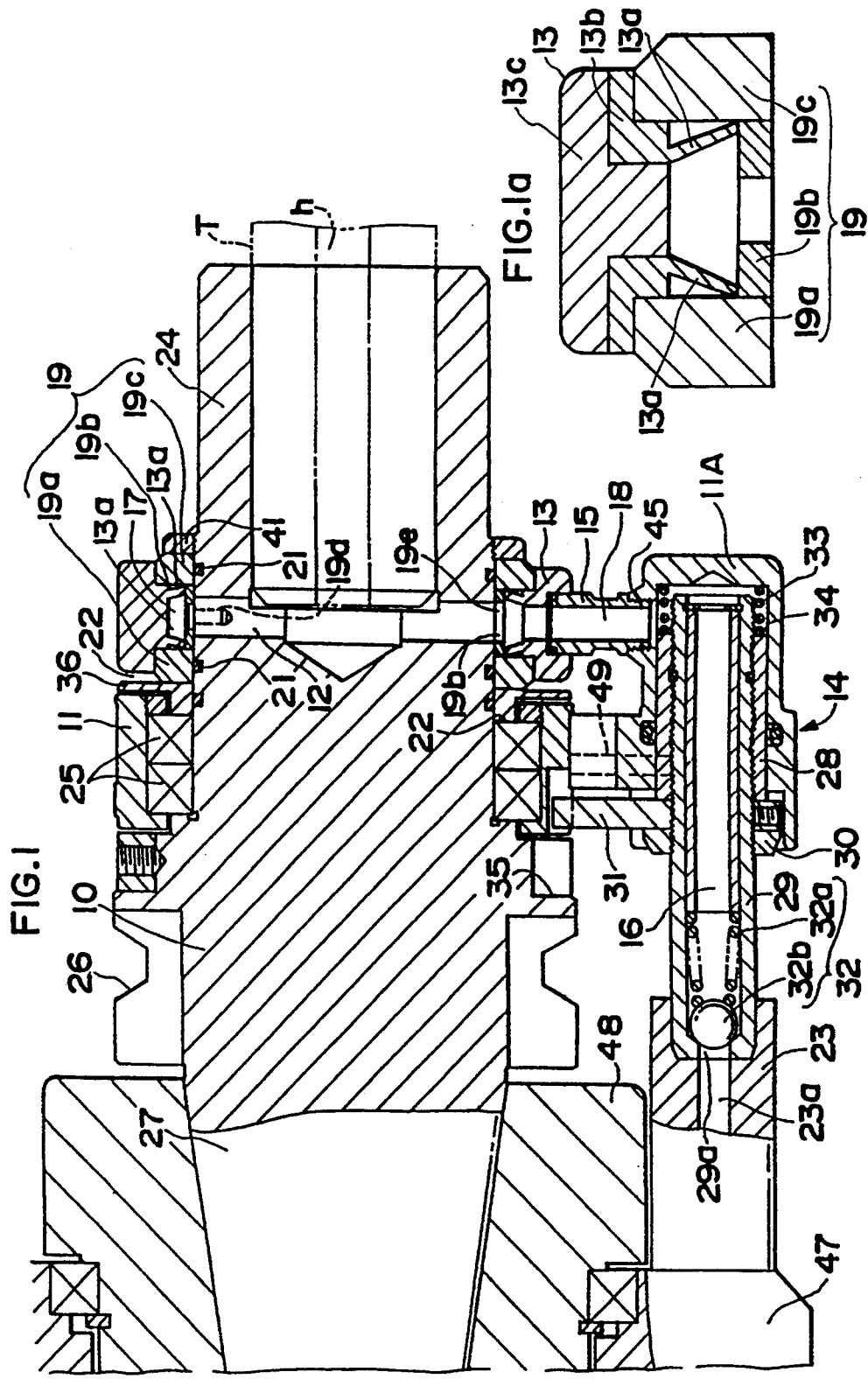
FIG. 1 is a partial cross-sectional view of a first embodiment of the present invention.

FIG. 1 shows a first embodiment of the present invention in which a manipulator engaging ring 26 and a shank 27 tapering outwardly of the ring, are formed concentrically toward one end of a rotary shaft 10. A socket 24 is concentrically formed in the other end of the rotary shaft, The socket 24 contains a cutting tool T with oil holes, A stationary support member 11 rotatably support the rotary shaft 10 by a bearing 25. A cylindrical chamber 11A is formed at a radially protruding portion on one side of the stationary support member, and containing a coolant coupling device 14 which also serves as a staking mechanism.

The coolant coupling device 14 having a hollow interior 16, comprises an outer sleeve 28 slidably disposed within the cylindrical chamber 11A in parallel to the rotary shaft 10. The outer sleeve can slide outwardly from the cylindrical chamber 11 toward the side of the tapering shank 27. An inner sleeve 29 is threaded toward into the outer sleeve 28. A locking nut 30 is threaded on the inner sleeve 29 and fixes a positioner plate 31 between the outer end of the outer sleeve 28 and the inner sleeve 29. A check valve 32 is disposed within the inner sleeve 29. The check valve 32 is comprised of a spring 32a and a ball-shaped valve element 32b is adapted to close a coolant intake port 29a by the bias force of the spring 32a pushing the ball element 32b against the intake port 29a. A compression coil spring 33 disposed between an end surface 34 of the outer sleeve 28 and the bottom of the cylindrical chamber 11A biases the outer sleeve 28 outwardly of the bottom of the chamber. As the outer sleeve 28 is pushed against the locking nut 30 by the force of the spring 33, in the out-of-use condition (shown e.g. in FIG. 10), the outer end of the positioner plate 31 enters a latching groove 35 within the rotary shaft 10 adjacent to the manipulator engaging ring 26 and couples the rotary shaft 10 with the stationary support member 11 to prevent relative rotation between the coupled parts. FIG. 1 shows the in-use condition of the device, in which the stationary support member 11 and with it the coolant coupling device 14, are disengaged from the rotary shaft 10.

Adjacent to the stationary support member 11 a stationary coolant feeder ring 13 is fitted over the rotary shaft 10. The mounting sequence of that ring first includes thick-wall ring-shaped first sleeve 19a is fitted over the rotary shaft 10 in contact with the side surface of the stationary support member 11, and then a collar-shaped second sleeve 19b is fitted over the rotary shaft 10 in contact with the first sleeve 19a. Then the stationary coolant feeder ring 13 is fitted over the first and second sleeves 19a and 19b, and then a third sleeve 19c is fitted over the rotary shaft 10, and finally a nut 41 is screwed on the rotary shaft 10 to prevent axial displacement of the stationary coolant feeder ring 13 but to keep it rotatable relative to the rotary shaft 10. The second sleeve 19b is fixed directly to the rotary shaft 10 with a screw 19d. The first, second and third sleeves 19a through 19c together form a sleeve 19. A wear plate 36 is disposed between stationary coolant feeder ring 13 and the stationary support member and along the bearing 25 for protecting the bearing. A drain groove 22 is provided between the wear plate 36 and the stationary coolant feeder ring 13 to drain off any possible coolant leakage away from the bearing 25.

Figure 2:
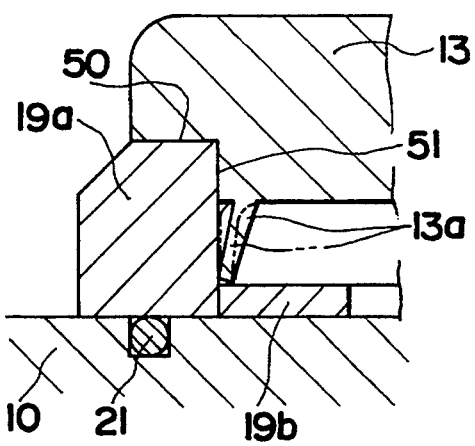
FIG. 2 is an enlarged view of the essential pan of the coolant feeder ring assembly of FIG. 1.
Figure 3:
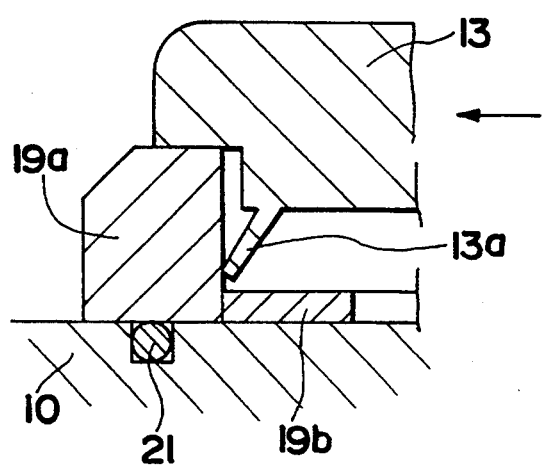
FIG. 3 shows the coolant feeder ring assembly of FIG. 2 in its operating condition.

As shown in FIGS. 1–3, the stationary coolant feeder ring 13 has a pair of lips 13a protrudingly installed on the inner circumferential surface thereof. The pair of lips 13a extend outwardly before the ring is fitted over the rotary shaft 10 so that the space between the opposite faces of them are taperingly widened. When the stationary coolant feeder ring 13 is fitted over the rotary shaft 10 through the sleeve 19, the pair of lips 13a are held between the first and third sleeves 19a and 19c of the sleeve 19, bringing the sides of both lips 13a in contact with the side surfaces of both the first and third sleeves 19a and 19c, while the tips of both lips 13a will thus be pushed together to contact the second sleeve 19b.

The stationary coolant feeder ring 13 is suitably of a hard synthetic resin, such as a hard polyacetal resin, vinyl chloride, ABS resin, nylon, tetrafluoro resin, and the like and is designed to bring the sides and the tips of the pair of lips 13a protruding from the inner circumferential surface of the ring in close contact with the sleeve 19 to secure oil tightness between the two parts. An annular groove 17 is formed on the inner circumferential surface of the stationary coolant feeder ring 13, and the pressure of the coolant fed to the annular groove 17, deflects both lips 13a toward the sides of the first and third sleeves 19a, 19c, respectively as shown in FIG. 2 by the alternate dashed lines so that further oil tightness is achieved between the two parts.

As shown in FIG. 1a, according to a second embodiment of the present invention the stationary coolant feeder ring 13 comprises the portion 13b forming a pair of lips 13a being separate from the ring proper 13c. In this second embodiment, the ring 13c can be made from steel and the portion 13b forming the pair of lips 13a is attached to the ring 13c and is suitably made from one of the aforementioned hard synthetic resins.

The annular groove 17 communicates freely with a radial coolant passage 12 in the rotary shaft 10 through a bore 19e provided in the second sleeve 19b. A coolant pipe 15 protrudes in the radial direction on that side of the stationary coolant ring 13 that is in contact with the coolant coupling device 14. The top end of the coolant pipe 15 is connected to a connecting hole 45 provided in the cylindrical chamber 11A of the coolant coupling device 14.

The stationary coolant ring 13 is kept stationary by connecting the coolant pipe 15 to the coolant coupling device 14, thereby restraining the stationary coolant ring 13 with the coolant coupling device 14, and preventing their rotation.

Figure 4:
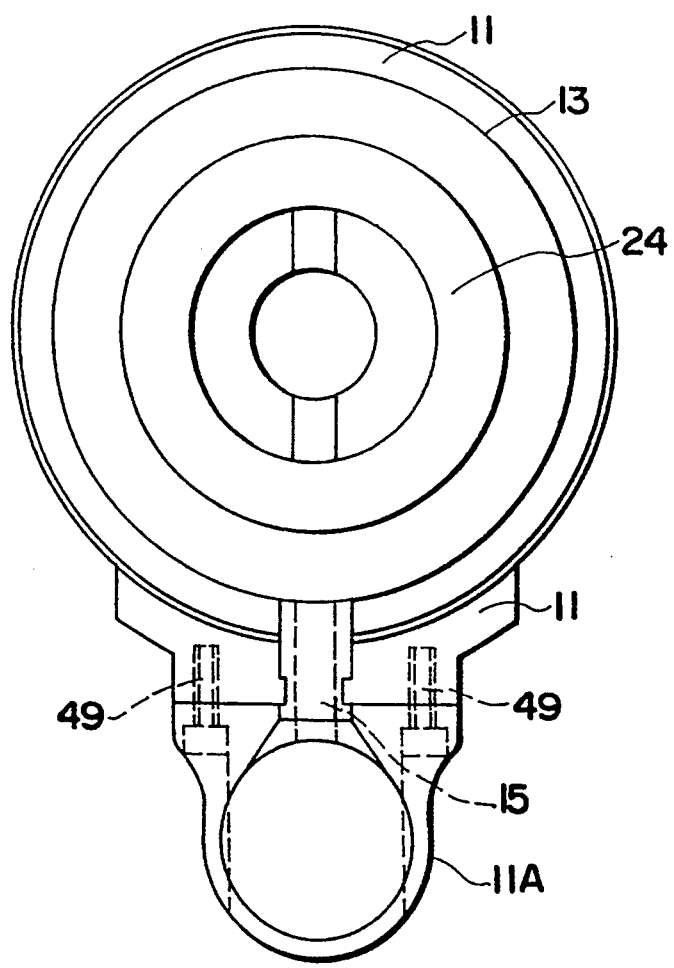
FIG. 4 is an end view of the present invention.

As shown in the end view of FIG. 4, the cylindrical chamber 11A with the coolant coupling device 14, is formed separately from the stationary support member 11, and both are designed to be coupled together with bolts 49. Consequently, in disassembling the stationary coolant feeding ring 13 from the rotary shaft 10, removing the nut 41 arresting the stationary coolant feeding ring 13 and loosening the bolts 49 that couple the coolant coupling device 14 to the stationary support member 11 enables the coolant coupling device 14 to be removed from the stationary support member 11. The coolant pipe 15 and the stationary coolant feeding ring 13 can then be easily pulled out from the rotary shaft 11 together with the third sleeve 19c.

Arranging the stationary coolant feeding ring 13 axially adjacent to the stationary support member 11 eliminates the necessity to disassemble the stationary support member 11 that is supported by bearings 25 from the rotary shaft 10, enabling quick disassembly of the device.

Since in the first embodiment shown in FIG. 1, the stationary support member 11 and the stationary coolant feeding ring 13, more precisely, the stationary support member 11 and the first sleeve 19a are kept in direct contact, and an oil sealing ring 21 is interposed between the first sleeve 19 and the rotary shaft 10. No coolant will leak from the stationary coolant feeding ring 13 to the side of the stationary support member 11.

Coolant will also not leak from the clearance between the first sleeve 19a and stationary coolant feeding ring 13, but even if some coolant should unexpectedly leak, such leaked coolant is discharged outside from a large gap 22 provided between the stationary coolant feeding ring 13 and stationary support member 11 and does not contact the side of the stationary support member 11.

Figure 5:
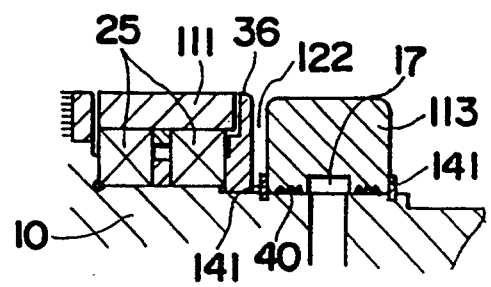
FIG. 5 is a partial cross-sectional view of the essential part of a third embodiment of the present invention.

In the third embodiment of the present invention shown in FIG. 5, the stationary coolant feeding ring 113 is fitted over the rotary shaft 10 adjacent to the stationary support member 111, both ends of which are latched to the rotary shaft 10 with snap rings 141 and mounted rotatably only relative to the rotary shaft 10. The annular groove 17 is formed on the inner circumferential surface of the stationary coolant feeder ring 113. A thread 40 is formed on the inner circumferential surface of the stationary coolant feeder ring 113 with the annular groove 17 in between. The thread 40 prevents as much as possible the leakage of the coolant to the side along the stationary support member 111 by friction between the coolant and the thread 40 when the coolant would tend to leak to the outside from the clearance and the groove 17 between the stationary coolant feeding ring 113 and the rotary shaft 10. If any coolant should nevertheless unexpectedly leak to the outside, the leaked coolant can be discharged by the drain 122 between the stationary support member 111 and stationary coolant feeding ring 113.

Figure 6:
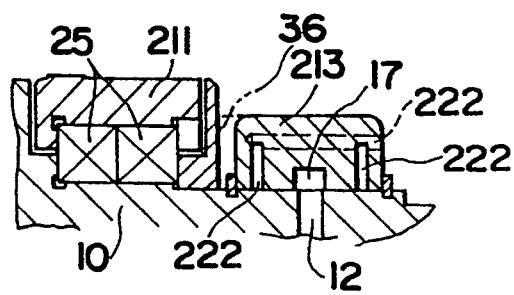
FIG. 6 is a partial cross-sectional view of the essential part of a fourth embodiment of the present invention.
Figure 7:
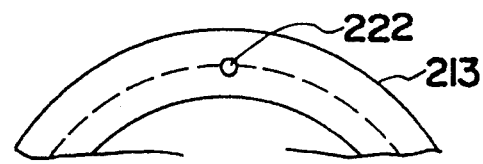
FIG. 7 is a front view of the essential part of the fourth embodiment of the present invention.

As shown in the fourth embodiment of FIGS. 6 and 7, a drainage passage 222 is in communication with the outside and is located in the coolant feeder ring 213. In this embodiment it is not necessary to provide a clearance between the stationary support member 211 and the stationary coolant feeder ring 213 and, as shown in FIG. 7 by the dash line, the stationary coolant feeder ring 213 can contact the stationary support member 211, or the stationary coolant feeder ring 213 may be designed to be built integral with the stationary support member 211.

Figure 8:
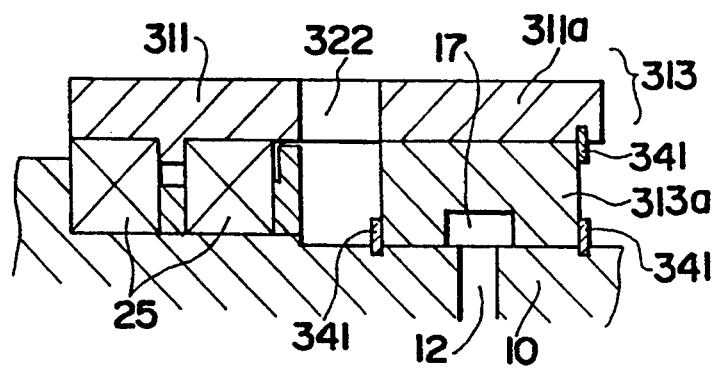
FIG. 8 is a partial cross-sectional view of the essential part of a fifth embodiment of the present invention.

This fourth embodiment of the present invention shows the case where the stationary coolant feeder ring 13 is installed separately from the stationary support member 11. As shown in FIG. 8 illustrating a fifth embodiment of the invention, the stationary support member 311 is constructed integrally with the stationary coolant feeder ring 313. Here, the stationary support member 311 is extended in the axial direction of the rotary shaft 10. A stationary coolant feeder ring member 313a is mounted on the inner circumference of the extended portion 311a and is attached with three snap rings 341, between the extended portion 311a and the rotary shaft 10. The stationary coolant feeder ring member 313a is installed to prevent axial displacement but to enable rotation only relative to the rotary shaft 10.

Both in the embodiments of FIGS. 1–7 in which the stationary coolant feeder ring 13 contacts the rotary shaft 10 through a sleeve construction 19, and in the embodiment of the invention shown in FIG. 8 the stationary coolant feeder ring member 313a, the material can be changed to reduce friction between the feeder and the rotary shaft as much as possible. For example, the material of the stationary coolant feeder ring 13 or ring member 313a can be of gun metal or a hard resin material contacting the steel of the rotary shaft 10. A hard synthetic resin material is particularly suitable for its ease and lower cost of processing and fabrication.

Figure 9:
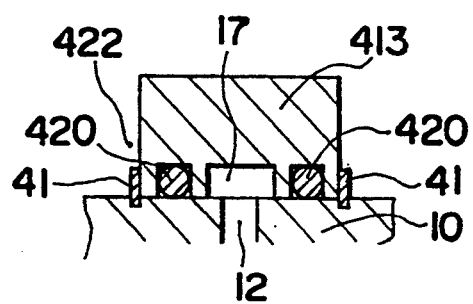
FIG. 9 is a partial cross-sectional view of the essential pan further showing the use of sealing rings.

As shown in FIG. 9, an oil tight sealing ring 420 can be also interposed on the inner circumference of the stationary coolant feeder ring 413 between the ring and the rotary shaft 10. Such a sealing ring can also be employed in the structure of FIG. 8 (not shown).

Figure 10:
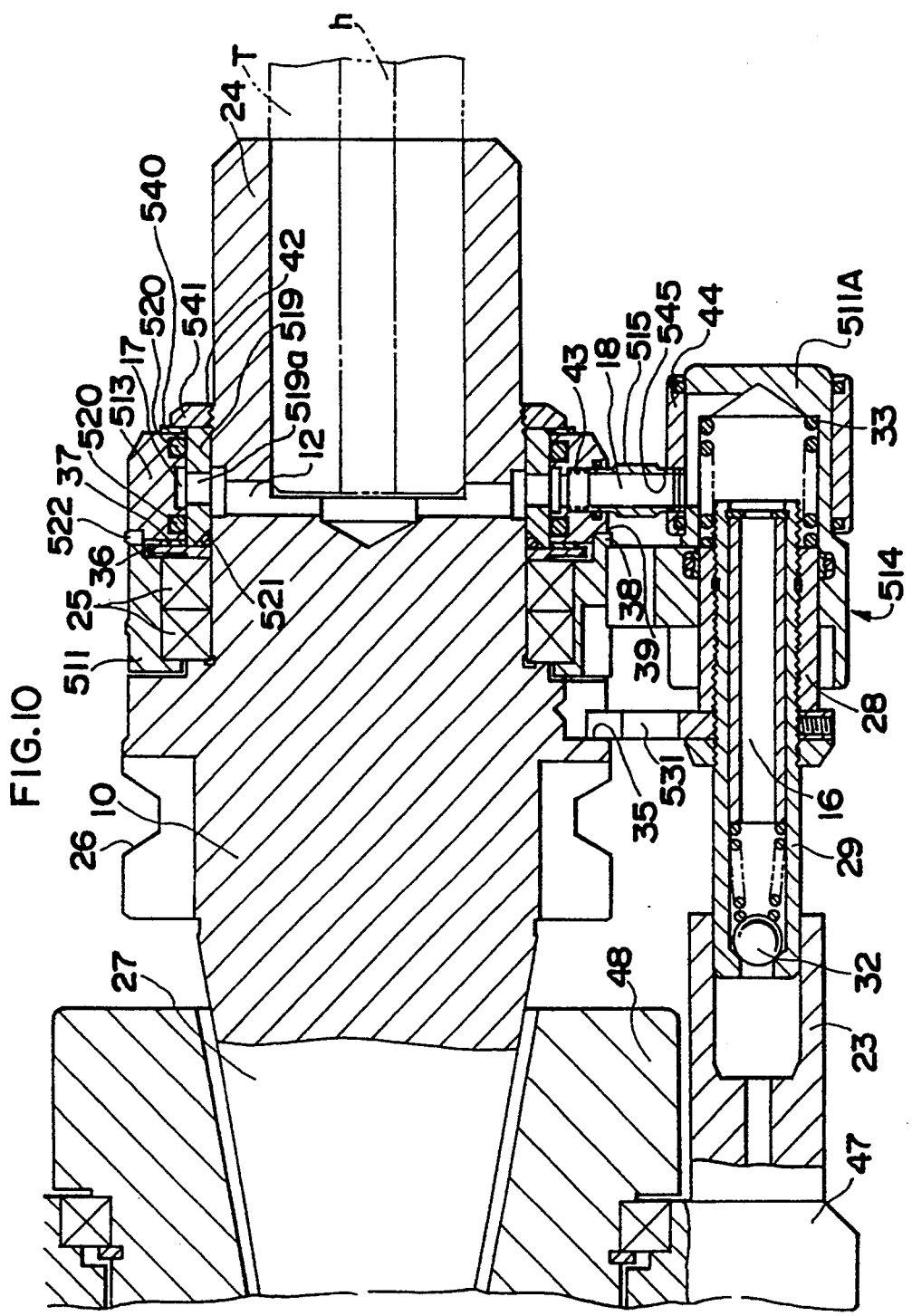
FIG. 10 is a partial perspective view of the essential part of a sixth embodiment of the present invention.
Figure 14:
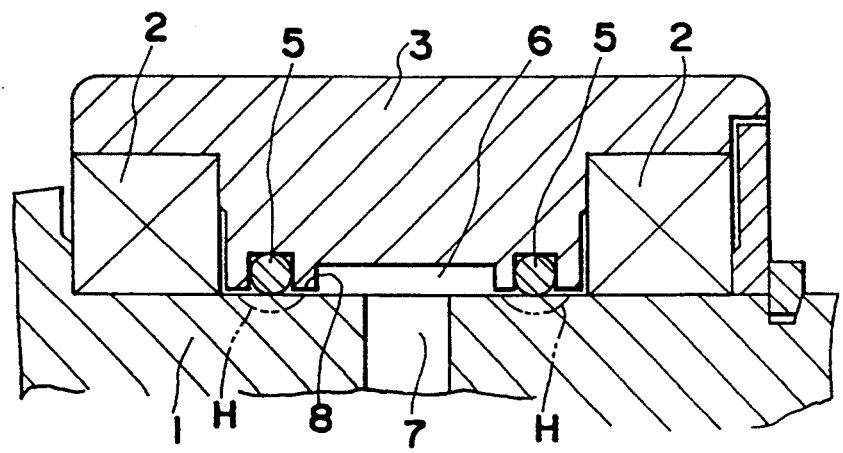
FIG. 14 is a partial cross-sectional view of the essential part of an embodiment of the prior art.
Figure 15:
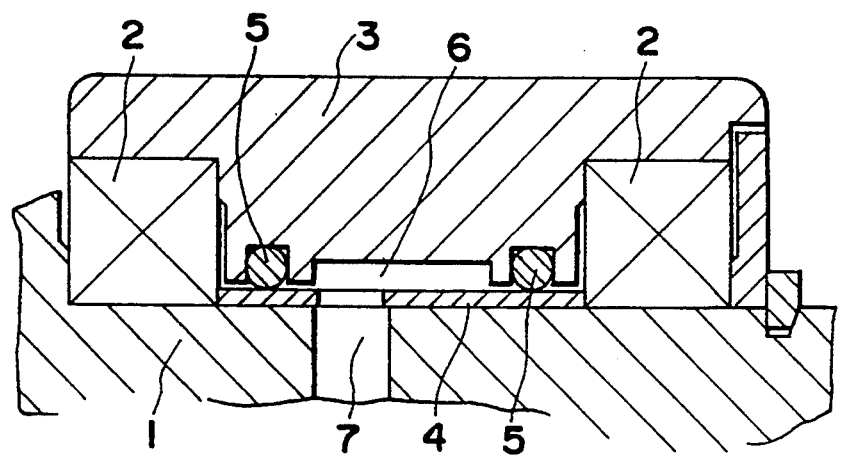
FIG. 15 is a partial cross-sectional view of an essential part of another embodiment of the prior art.

FIG. 10 shows a sixth embodiment of the present invention and in contrast with the in-use condition of the apparatus of the present invention shown in FIG. 1 in which the coolant coupling device 14 is latched to the coolant feeding base 23, FIG. 10 shows the condition of the apparatus in which the coolant coupling device 514 is detached or released from the coolant feeding base 23. Consequently, the idle end of the positioner plate 531 fits in the latching groove 35 in the rotary shaft 10 adjacent to the engaging ring 26 and latches the rotary shaft 10 and stationary support member 511 to prevent their relative rotation.

In this sixth embodiment, a sleeve 519 is disposed between the stationary coolant feeder ring 513 and the rotary shaft 10, and the sleeve 519 is fixed to the rotary shaft 10 with a locking nut 541. The annular groove 17 is disposed on the inner circumference of the stationary coolant feeder ring 513 and along the sleeve 519 and a coolant passage 519a in communication with the annular groove 17 and with these annular groove 17 and coolant passage 519a located in between. A pair of oil sealing rings 520 are in contact with the outer surface of the sleeve 519 that is mounted on the inner surface of the stationary coolant feeder ring 513.

A coolant pipe 515 is mounted protruding from the stationary coolant feeder ring 513 is biased by a spring 43 to move forward and to be able to retract against the bias of the spring 43. When the coolant pipe 515 protrudes under the bias of the spring 43, it connects with the hollow 16 interior of the coolant coupling device 514. In the embodiment of FIG. 1, the coolant pipe 15 is designed to connect with the cylindrical chamber 11A of the coolant coupling device 14 through the connecting hole 45. As shown in the sixth embodiment of the present invention in FIG. 10, the coolant pipe 515 connects with the hollow interior 16 of the coolant coupling device 514 by the outer end of the coolant pipe 515 to fitting into a connecting hole 545 on the cylindrical body 44. The connecting hole 545 fits in an oil tight manner into the circumference of the cylindrical chamber 511A of the coolant coupling device 514. Since the cylindrical body 44 can rotate on the surface of the cylindrical chamber 511A, the circumferential position of attachment of the coolant pipe 515 can be advantageously adjusted with respect to the coolant coupling device 514.

A sleeve 519 is suitably made from chromium plated steel, a combination of hardened steel and cemented carbide, or a material coated with a ceramics such as titania, or any other material the surface of which has good resistance to wear.

An oil-tight lower sealing ring 521 is mounted on the inner circumferential surface of the sleeve 519 in close contact with the rotary shaft 10. A wear plate 36 and sliding contact plate 37 are interposed between the stationary coolant feeder ring 513 with the sleeve 519 and the stationary support member 11. An engagement protrusion 38 is formed on the stationary support member 511 for latching to a latching indentation 39 in the stationary coolant feeder ring 513 so that the stationary coolant feeder ring 513 is latched to the stationary support member 511 and is held stationary. Other configurations of the sixth embodiment shown in FIG. 10 are the same as that of the first embodiment shown in FIG. 1, and therefore further explanation of the parts is omitted by like reference numerals are employed as in FIG. 1.

In the embodiment of FIG. 10, the oil tight sealing ring 520 is disposed between the stationary coolant feeding ring 513 and the sleeve 519 and the lower oil tight sealing ring 521 is disposed between the sleeve 519 and the rotary shaft 10.

According to a further, seventh embodiment of the present invention, as shown in FIG. 11, the sleeve 619 and the rotary shaft can also directly contact each other without interposition of the oil tight lower sealing ring. In the latter case, friction between the two parts can be reduced by appropriate selection of their materials. The material of the stationary coolant feeder ring 613 can be, for example, of gun metal or hard resin material, while the sleeve 619 is suitably from either iron or steel. A drain hole 522, 622 as also shown in FIG. 12, is formed at intervals on the outer circumferential surface of the stationary support member 511, 611. These drain holes are arranged at the boundary between the stationary support member 511 and the stationary coolant feeding ring 513 as shown in FIG. 10.

In the sixth embodiment of the present invention shown in FIG. 10, a sliding contact plate 540 is disposed in contact with the end of the stationary coolant feeder ring 513 toward the locking nut 541 which is screwed into the thread 42 cut into the outer surface of the rotary shaft 10 to prevent axial displacement of the sleeve 519 and stationary coolant feeding ring 513. This also enables rotation of the sleeve 519 with the rotary shaft 10.

The coolant coupling device 14, 514 also serves to lock the stationary support member 11, 511 by latching it (as shown in FIG. 1) to the coolant feeding base 23 at the fixed portion 47 of the machine tool. When the positioner plate 31, 531 retracts against the bias of the coil spring 33 and the latching engagement is released between the positioner plate 31, 531 and the latching groove 35 on the side of the rotary shaft 10 the rotary shaft 10 is held against the stationary support member 11, 511. The required cutting operation takes place with the rotating cutting tool "T" mounted to the socket 24 at the end of the tool holder.

At that stage, the coolant delivered from the coolant supply groove of the coolant feeding base 23 pushes open the check valve 32 from its closed position as shown in FIG. 10, to its open position as shown in FIG. 1. The coolant passes through the hollow interior 16 of the coolant coupling device 14, 514, through the radial passage 18 of the coolant pipe 15 and the annular groove 17 of the stationary coolant feeder ring 13, 513. As the inner surface of the stationary coolant feeder ring 13, 513, is in direct and oil tight contact with the outer surface of the rotary shaft to properly maintain an oil tight condition, or with the oil tight condition being assured by a pair of oil fight sealing rings 20, 520, the coolant is delivered through the radial coolant passage 12 to the oiling hole "h" of the cutting tool "T" and the coolant is then discharged from the other end of the tool "T".

Since some of the coolant could normally leak at the bearing 25 where the stationary support member 11, 511 is journaled, and thus cause possible damage to the bearing 25, the present invention provides drainage means such as the drain 22. Thus, even if there is some unexpected coolant leakage toward the bearing 25, this is discharged by the drain 22 and thus the coolant does not enter the bearing 25.

In the first and second embodiments of the present invention shown in FIGS. 1–3, the pair of lips 13a, are firmly pressed by the stationary coolant feeder ring 13 against the sleeve 19, thereby providing improved securing oil tightness between them.

Due to the rotation of the rotary shaft 1 and the sleeve 19 while the stationary coolant feeding ring 13 remains stationary, the stationary coolant feeding ring 13 can move laterally while the rotary shaft 10 is rotating. However, as shown in FIG. 2, lateral displacement of the stationary coolant feeding ring 13 is restrained by the portions 50, 51 which contact the sleeve 19.

During prolonged use, cuttings and shavings contaminate the coolant and thus enter the clearance between the outer surface of the rotary shaft 10 or the outer surface of the sleeve 19, 519 and the stationary coolant feeder ring 13, 513, thus can reduce or destroy the oil tight character of the seal between the stationary coolant feeder ring 13, 513 and the rotary shaft 10 or the sleeve 19, 519. In the first five embodiments of the present invention as shown in FIGS. 1–9, simply loosening the bolts 49, as shown in FIG. 4 and disassembling the cylindrical chamber 11A from the stationary support member 11 enables the separation of the coolant pipe 15 from the stationary coolant ring 13. In the sixth and seventh embodiments of the present invention as shown in FIGS. 10 and 11, the coolant pipe 515 can be withdrawn against the bias of the spring 43 and the coolant pipe 515 can then be separated from the coolant coupling device 514. The nut 14 is then removed and, as shown in FIG. 13, either the stationary coolant ring 13, 513 alone or both the sleeve 19, 519 and the stationary coolant feeder ring 13, 513 located around its outer circumference are, as the case may be, integrally or separately removed from the side towards the tool, and the sleeve 19, 519 alone or with the by then most likely worn oil tight sealing rings 20, 520 can be replaced as may be required.

Replacement maintenance is very easy, because it is entirely unnecessary to disassemble the stationary support member 11, 511 and the beatings 25 which provide for rotation of the stationary support member 11, 511 or the coolant coupling device 14, 514 that is integral with the stationary support member 11, 511 from the rotary shaft 10.

Mounting the rotary shaft 10 from the spindle 48 of a machine tool in a manner known per se and connecting the coolant coupling device 14, 514 which supports the stationary support member 11 (111, 211, 311, 411, 511, 611) free from rotation with the coolant feeding base 23 enables the rotary shaft 10 to be rotatably journaled by the stationary support member 11. This also enables the stationary coolant feeder ring 13 (113, 213, 313, 413, 513, 613) to be supported by or latched with the stationary support member 11, or to be supported free from rotation by being restricted with the coolant coupling device 14, 5 14 via the coolant pipe 15, 515. The annular groove 17 of the stationary coolant feeder ring 13 is in constant communication with the radial passage 18 of the coolant pipe 15, 515 as well as the hollow interior of the coolant coupling device 14, 514 irrespective of the rotation of the rotary shaft 10. Thus the coolant coupling device 14, 514 connected to the coolant feeding base 23 allows the coolant to flow from the base through the hollow interior 16 of the coolant coupling device 14, 514, the radial passage for coolant pipe 15, 515, and the annular groove 16 of the stationary coolant feeder ring 13, the radial passage 18 of the oil pipe 15, 515, the annular groove 17 of the stationary coolant feeding ring 13 and radial passage 12 of the rotary shaft to the oil hole "h" of the tool "T".

The stationary coolant feeder ring alone can be replaced when the stationary coolant feeder ring 13 is worn over a long time of application, for example, if the stationary coolant feeder ring 13 is formed from a hard resin, and the inner circumference of the stationary coolant feeder ring 13 in contact with the outer circumference of the rotary shaft 10 wears and some oil tightness is lost between the two. Therefore, it is not only not necessary to disassemble from the rotary shaft 10 the stationary support member 11 journaling the rotary shaft 10, or the coolant coupling device 14, 514 which is built integrally therewith, but it is also only rarely necessary to replace the stationary coolant feeder ring 13 itself.

The drain for discharging coolant 22 (122, 222, 322, 422, 522, 622) provides fail-safe capabilities. It is interposed between the stationary support member 11 and the stationary coolant feeder ring 13. Any coolant leaking from the clearance between the stationary coolant feeder ring 13 and the rotary shaft 10 is discharged by the drain 22 before it could reach the bearing 25 of the stationary support member 11 and does not enter said bearing 25. Since the stationary coolant feeder ring 13 is built separately from the stationary support member 11, the material of the stationary coolant feeder ring 13 can be different than that of the stationary support member 11 and can be formed from e.g. a hard synthetic resin or a material different from the rotary shaft 10 which can suitably be a gun metal.

The removable sleeve 19, 519 between the stationary coolant feeder ring 13 and the rotary shaft 10 becomes worn during use over a long period, the sleeve can be removed alone from the rotary shaft 10 and replaced with a new sleeve.

Lips 13a are protrudingly mounted on the inner surface of the stationary coolant feeder ring 13 and are designed closely to contact the sleeve 19, not only to provide oil tightness between them, but also both lips 13a are elastically deformed by the pressure of the coolant fed to the inner surface of the stationary coolant feeder ring 13 and brought more strongly in contact with the sleeve 19, thereby further improving oil-tightness between them.

The stationary coolant feeder ring 13, 113, 213, 413, 513, 613 which is separate from the stationary support member 11, 111, 211, 411, 511, 611 is made from hard synthetic resin or gun metal. Therefore, it can be easily machined and fabricated at low costs. Furthermore, since it is possible to select a material having a low coefficient of friction, it can be used in a stable manner over longer periods of time.

As the stationary coolant feeder ring 313 is built integrally with the stationary support member 311, the stationary coolant ring 313 is securely supported by the stationary support member 311 and is of a simple construction.

The stationary coolant feeder ring 313 has an outside cover 311a formed integrally with the stationary support member 311. A stationary coolant feeder ring member 313a is independent from the outside cover 311a but is supported on the inner side. When the stationary coolant feeder ring member 313a that is directly in contact with the rotary shaft 10 becomes worn, it is not required to replace the entire stationary coolant feeder ring 313, but only the stationary coolant feeder ring member 313a which results in cost savings.

If after use over a long period of time, the inner circumferential surface of the stationary coolant feeding ring 13, 513, wears due to cuttings or shavings entering between the outer surface of the rotary shaft 10 and the inner surface of the stationary coolant feeder ring 13, 513 resulting in possible pitting or dents, and loss of oil tightness between them or replacement of the stationary coolant feeding ring 13, 513, may be required. The replaceable coolant pipe 15, 515 is released from either the stationary coolant feeder ring 13, 513, or the coolant coupling device 14, 514, the stationary coolant feeder ring 13, 513 should be moved along the outer circumferential surface of the rotary shaft 10 and removed from the side of the socket 24. Thus, it is not necessary to disassemble the stationary support member 11, 511 journaling the rotary shaft 10 or the coolant coupling device 14, 514 built integrally therewith from the rotary shaft 10.

The renewed sleeve 19, 519 is remounted to the outer surface of the rotary shaft 10 together with the stationary coolant feeder ring 13, 513, and the coolant pipe 15, 515 is connected from the coolant coupling device 14, 514, and a series of coolant feeding passages are thus formed. The tool holder assembly is formed by interposing the oil-tight sealing ring 520 between the stationary coolant feeder ring 513 and the sleeve 519, securing a good oil-tight seal between them.

The tool holder assembly is formed by interposing the sub-oil-tight sealing ring 21, 521 between the sleeve 19, 519 and the rotary shaft 10, thus securely preventing an entry of coolant to the bearing 25.

The tool holder assembly is formed by providing the threads 40, on the inner surface of the stationary coolant feeder ring 113, with the annular groove 17. The coolant is restricted by the thread 40 by frictional action between the thread 40 and the coolant when the coolant tries to leak outside from the clearance between the stationary coolant feeder ring 113 and the rotary shaft 10 by rotation of the rotary shaft 10. This prevents any leakage as much as possible and pushes the coolant back to the annular groove 17 by the thread 40 being formed in the direction which results in the pushing back of any coolant leaking from the outer surface thereof during the rotation of rotary shaft 10 toward the annular groove 17.

The stationary coolant feeder ring 13, 513 is supported non-rotatably on the machine tool side of the apparatus from the coolant coupling device 13, 513 via the coolant pipe 15, 515, and a series of coolant passages formed by the stationary coolant ring 13, 513 are maintained.

The stationary coolant feeder ring 513 is engaged with the stationary support member 511 by the engagement means 38, 39 and is held stationary. A series of coolant feeding passage formed by the stationary coolant feeding ring 13, 513 is securely maintained.

The stationary support member 11, 511 is integrally built with the coolant coupling device 14, 514 which can be connected to the coolant feeding base 23 disposed on the machine tool side. The coolant feeding base 23 has a positioner plate 31, 531 to prevent relative rotation of the coolant coupling device 14, 514 and the rotary shaft 10 by allowing the two to check each other when the coolant coupling device 14, 514 is not connected to the coolant feeding base 23 as well as releases the checking condition between the coolant coupling device 14, 514 and the rotary shaft 10 and enables rotation of the rotary shaft 10 when the coolant coupling device 14, 5 14 is connected to the coolant feeding base 23. Therefore, the stationary support member 11, 511 and the coolant coupling device 14, 51 integral therewith are transported from the spindle 48 to magazines free of oscillation and are accurately placed in magazines under the fixed condition integral with the rotary shaft 10 when they are released from the spindle 48 on the machine tool side.

I claim:

1. A coolant feeder in a tool holder assembly which has a rotary shaft for mounting from the spindle of an associated machine tool, the feeder comprising a stationary support member for journaling the rotary shaft, a stationary coolant feeder ring assembly having a hollow interior is disposed adjacent to said stationary support member, said stationary coolant feeder ring assembly being in fluid communication with a tool holding passage within the rotary shaft, a coolant coupling device having a hollow interior, a coolant pipe for maintaining fluid communication between the hollow interior of the coolant coupling device, the stationary support member, said passage, and said coolant feeder ring assembly.

2. The coolant feeder of claim 1, further comprising a drain between said coolant feeder ring assembly and said stationary support member.

3. The coolant feeder of claim 2, wherein said drain is a passage between said coolant feeder ring assembly and said stationary support member for preventing any coolant leaking from said coolant feeder ring assembly from contacting said stationary support member.

4. The coolant feeder of claim 1, further comprising a removable sleeve disposed between said stationary coolant feeder ring assembly and the rotary shaft.

5. The coolant feeder of claim 4, wherein said stationary coolant feeder ring assembly comprises a sealing member having a pair of sealing lips protruding into the hollow interior of said assembly and in contact with said removable sleeve.

6. The coolant feeder of claim 2, wherein said drain connects the interior of said coolant feeder ring assembly to the outside thereof.

7. The coolant feeder of claim 2, wherein said coolant feeder ring assembly is of a hard synthetic resin, or of gun metal.

8. The coolant feeder of claim 2, wherein said stationary support member is built together with said stationary coolant feeder ring assembly, and said drain is a drain passage between said support member and said ring assembly.

9. The coolant feeder of claim 8, said stationary coolant feeder ring further comprising an outside cover, and a stationary coolant lubricating ring, said outside cover being built together with said stationary support member and stationary coolant lubricating ring.

10. The coolant feeder of claim 9, wherein said stationary coolant lubricating ring is of a hard synthetic resin, or of gun metal.

11. The coolant feeder of claim 4, wherein said stationary support member is separate from said stationary coolant feeder ring, and said coolant pipe is removable from the feeder.

12. The coolant feeder of claim 11, wherein said removable sleeve is adapted to rotate with the rotary shaft.

13. The coolant feeder of claim 11, further comprising an oil-tight ring disposed between said stationery coolant feeder ring and said sleeve.

14. The coolant feeder ring of claim 13, further comprising a further oil-tight ring disposed between said sleeve and the rotary shaft.

15. The coolant feeder of claim 2, further comprising annular threads on a bottom surface of said stationary coolant feeder ring, and an annular groove in the bottom surface of said stationary coolant feeder ring assembly in the center of said annular threads.

16. The coolant feeder of claim 2, wherein said stationary coolant feeder ring assembly is supported by said coolant pipe from said coolant coupling device.

17. The coolant feeder of claim 2, further comprising engaging means for engaging said stationary coolant feeder ring assembly with said stationary support member.

18. The coolant feeder of claim 1, wherein said stationary support member is built together with said coolant coupling device, further comprising a coolant feeding base connected by said coolant coupling device to the coolant feeder, said coolant feeding base comprising a positioner plate for preventing relative rotation between said coolant coupling device and the rotary shaft when said coolant coupling device is not connected from said coolant feeding base, and enables relative rotation between said coolant coupling device and the rotary shaft when the coolant coupling device is connected from said coolant feeding base.

* * * * *